(12) United States Patent
Vanhelle et al.

(10) Patent No.: US 10,894,546 B2
(45) Date of Patent: Jan. 19, 2021

(54) METHOD AND APPARATUS FOR IN-VEHICLE IMPAIRMENT DETECTION WITH DRIVER VERIFICATION

(71) Applicant: Valeo Comfort and Driving Assistance, Zi Europarc (FR)

(72) Inventors: Stephane Vanhelle, Mieussy (FR); Mithran Menon, Sunnyvale, CA (US)

(73) Assignee: Valeo Comfort and Driving Assistance, ZI Europarc (FR)

( * ) Notice: Subject to any disclaimer, the term of this patent is extended or adjusted under 35 U.S.C. 154(b) by 187 days.

(21) Appl. No.: 16/165,539

(22) Filed: Oct. 19, 2018

(65) Prior Publication Data
US 2020/0122731 A1 Apr. 23, 2020

(51) Int. Cl.
*B60W 40/08* (2012.01)
*B60W 50/12* (2012.01)

(52) U.S. Cl.
CPC ............ *B60W 40/08* (2013.01); *B60W 50/12* (2013.01); *B60W 2040/0836* (2013.01); *B60W 2420/42* (2013.01); *B60W 2540/24* (2013.01); *B60W 2540/26* (2013.01); *B60W 2900/00* (2013.01)

(58) Field of Classification Search
CPC ................. B60W 40/08; B60W 50/12; B60W 2040/0836; B60W 2420/42; B60W 2540/24; B60W 2540/26; B60W 2900/00

USPC .......................................................... 701/36
See application file for complete search history.

(56) References Cited

U.S. PATENT DOCUMENTS

| | | | |
|---|---|---|---|
| 9,296,298 B2 | 3/2016 | Williams et al. | |
| 2008/0036187 A1* | 2/2008 | Breed | B60R 21/01542 280/735 |
| 2009/0142790 A1* | 6/2009 | Fang | G01N 33/554 435/29 |
| 2014/0297111 A1 | 10/2014 | Takahashi | |
| 2015/0066238 A1 | 3/2015 | Todd et al. | |

FOREIGN PATENT DOCUMENTS

| | | | |
|---|---|---|---|
| CN | 101964133 A | | 2/2011 |
| CN | 202491690 | * | 10/2012 |
| CN | 202491690 U | | 10/2012 |
| EP | 1849644 A1 | | 10/2007 |

* cited by examiner

*Primary Examiner* — Gertrude Arthur Jeanglaude
(74) *Attorney, Agent, or Firm* — Oblon, McClelland, Maier & Neustadt, L.L.P.

(57) ABSTRACT

A method for enabling driver operation of a motor vehicle includes receiving an electrical signal representing a property sensed by touching a region of skin of an occupant in the motor vehicle, and determining whether the occupant's ability to drive the motor vehicle is impaired based on the electrical signal. The method further includes performing an image based verification to determine whether the occupant from whom the property was sensed is in a driving position of the motor vehicle, and providing a control signal to enable operation of the motor vehicle based on a result of the determining and a result of the image based verification.

19 Claims, 6 Drawing Sheets

METHOD AND APPARATUS FOR IN-VEHICLE IMPAIRMENT DETECTION WITH DRIVER VERIFICATION

TECHNICAL FIELD OF THE EMBODIMENTS

This disclosure relates generally to enabling vehicle operation based on a detected impairment state of a vehicle occupant, and more particularly to automatic verification that the occupant for which impairment is detected is the vehicle driver.

BACKGROUND OF THE EMBODIMENTS

Impaired driving is a major safety issue of international interest and concern. For example, it is well known that alcohol impaired driving accounts for a significant proportion of annual traffic fatalities. To reduce alcohol impaired driving, it is known to use alcohol ignition interlocks on vehicles, which require drivers to pass an alcohol screening test before starting the vehicle. With these in-vehicle detection systems, sensing an alcohol concentration that causes impairment prevents the vehicle from being started.

In-vehicle alcohol detection systems that sample the occupant's breath are common. However, such devices are obtrusive and typically used only by court ordered offenders of driving under influence (DUI) laws. Some breath-based alcohol detection systems can measure the alcohol level in a driver's naturally exhaled breath as the driver breathes normally. While these "alcohol sniffing" systems can obtain breath samples unobtrusively, the need to accurately distinguish between the driver's breath and that of any passengers makes these systems complex, expensive and often prone to error.

Touch-based alcohol detection systems are also known to be provided in vehicles. For example, touch-based alcohol detectors may be mounted on a vehicle push-to-start button or on the vehicle steering wheel. While these systems are generally less obtrusive to the driver, they also suffer from inaccuracy. For example, a touch-based push-to-start sensor may generate false negatives where a person with higher blood alcohol concentration than the legal limit will be allowed to drive (i.e., will not trigger the interlock device). Further, steering wheel mounted sensors require scarce packaging space that is typically reserved for critical control electronics and safety equipment such as airbags.

Existing touch-based impairment detector systems are also problematic in that they can be defeated. For example, an object or non-driving occupant may be used to perform the touch-based test to enable driving by an impaired driver. Efforts to prevent this bypassing of the touch based-sensors typically require driver identification information to be stored in memory as a point of reference for automatically confirming real time driver identity measurements. Alternative methods record the driver and store or transmit video for evaluation of driver identity only after the system has been defeated and impaired driving has occurred.

The foregoing "background" description is provided for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY OF DISCLOSED EMBODIMENT

It is one object of the present disclosure to provide an in-vehicle impairment detection system and method that addresses the above-noted and other problems with known in-vehicle impairment detector systems.

Another object of the present disclosure is to provide an in-vehicle impairment detector which verifies that the detected occupant is the vehicle driver.

Yet another object of the present disclosure is to provide an in-vehicle touch based impairment detector located in a predetermined location to provide accurate detection results as a seamless part of the driving task.

These and/or other objects may be provided by embodiments disclosed herein, which include the following aspects.

Aspect (1) provides a method for enabling driver operation of a motor vehicle which includes receiving an electrical signal representing a property sensed by touching a region of skin of an occupant in the motor vehicle, and determining whether the occupant's ability to drive the motor vehicle is impaired based on the electrical signal. The method further includes performing an image based verification to determine whether the occupant from whom the property was sensed is in a driving position of the motor vehicle, and providing a control signal to enable operation of the motor vehicle based on a result of the determining and a result of the image based verification.

Aspect (2) provides the method of aspect (1), wherein the electrical signal is received from a biosensor in contact with the region of skin.

Aspect (3) provides the method of aspect (2), wherein the biosensor includes a transdermal alcohol detecting sensor.

Aspect (4) provides the method of Aspect (2), wherein the biosensor includes an optical sensor or chemi-capacitive sensor, the method further including performing optical spectroscopy or changes in permittivity in the chemi-capacitive sensor on the electrical signal.

Aspect (5) provides the method of aspect (1), wherein the determining whether the occupant's ability to drive the motor vehicle is impaired includes analyzing the electrical signal to estimate concentration of at least one substance in the occupant's body, and comparing the estimated concentration to a stored threshold concentration to determine whether the occupant's ability to drive the motor vehicle is impaired.

Aspect (6) provides the method of aspect (5), wherein analyzing the electrical signal includes determining a blood alcohol concentration (BAC) of the occupant.

Aspect (7) provides the method of aspect (1), wherein the performing an image based verification includes collecting image data of a scene in the motor vehicle using a camera, and analyzing the image data to determine whether the region of skin is on the body of the occupant in the driving position of the motor vehicle.

Aspect (8) provides the method of aspect (7), wherein the camera is a near infrared (IR) camera.

Aspect (9) provides the method of aspect (1), wherein the providing a control signal includes providing a vehicle enable signal: when the result of the determining step indicates that the occupant is not impaired, and when the result of the image based verification indicates that the occupant is in the driving position of the vehicle.

Aspect (10) provides an apparatus including a sensor at a predetermined location in a cabin of a vehicle to detect content of a predetermined substance by contact with a human occupant of the vehicle. An interlock device prohibits engaging a drive train of the automobile if the detected content is above a predetermined threshold, and an image capturing device to image the cabin of the vehicle. A processor is configured to compare the detected content to the predetermined threshold, determine, from the cabin imaging, that contact with the sensor is by an occupant in a driver's seat, and engage the interlock device to prohibit engagement of the drive train in response to either the substance level being above the predetermined threshold, or the occupant not being in the driver's seat.

Aspect (11) provides the apparatus of aspect (10), wherein the predetermined substance is alcohol.

Aspect (12) provides the apparatus of aspect (10), wherein the alcohol detection sensor is a transdermal alcohol detection sensor configured to detect the alcohol concentration from contact with a palm of the occupant.

Aspect (13) provides the apparatus of aspect (12), wherein the predetermined location of the transdermal alcohol detection sensor is on at least one of an armrest, a hand rest and a wrist rest in the cabin.

Aspect (14) provides the apparatus of aspect (10), wherein the processor is further configured to determine, from the cabin imaging, whether body part of the human occupant in contact with the sensor is part of a human body which occupies the driver's seat of the vehicle.

Aspect (15) provides the apparatus of aspect (14), wherein the processor is further configured to activate the interlock to prohibit engaging the drive train if the region is not part of the human body which occupies the driver's seat of the vehicle.

Aspect (16) provides the apparatus of aspect (10), wherein the imaging device is a three-dimensional time of flight camera that generates point cloud data of occupants in the cabin.

Aspect (17) provides the apparatus of aspect (10), wherein the interlock device is mechanically coupled to a gearshift to prohibit engagement of the drive train.

Aspect (18) provides the apparatus of aspect 17, wherein the predetermined location of the sensor is proximal to the gearshift such that the gearshift can be operated by the occupant while in contact with the sensor.

Aspect (19) provides the apparatus of aspect 12, wherein the sensor is a transdermal sensor.

Aspect (20) provides a device for enabling vehicle operation, including: a controller including a processor and a memory which stores a software routine executable by the processor to: determine whether a vehicle occupant's ability to drive the motor vehicle is impaired based on an electrical signal representing a property sensed from a region of skin of the occupant; perform an image based verification to determine whether the occupant from whom the property was sensed is in a driving position of the motor vehicle; and generate a control signal to enable operation of the motor vehicle based on a result of the determining and a result of the image based verification.

The different aspects of the embodiments can be combined together or separately taken.

The foregoing paragraphs have been provided by way of general introduction, and are not intended to limit the scope of the claims. The described embodiments, together with further advantages, will be best understood by reference to the following detailed description taken in conjunction with the accompanying drawings.

BRIEF DESCRIPTION OF THE DRAWINGS

A more complete appreciation of the embodiments and many of the attendant advantages thereof will be readily obtained as the same becomes better understood by reference to the following detailed description when considered in connection with the accompanying drawings, wherein.

DETAILED DESCRIPTION OF SEVERAL EMBODIMENTS

Figure 1:
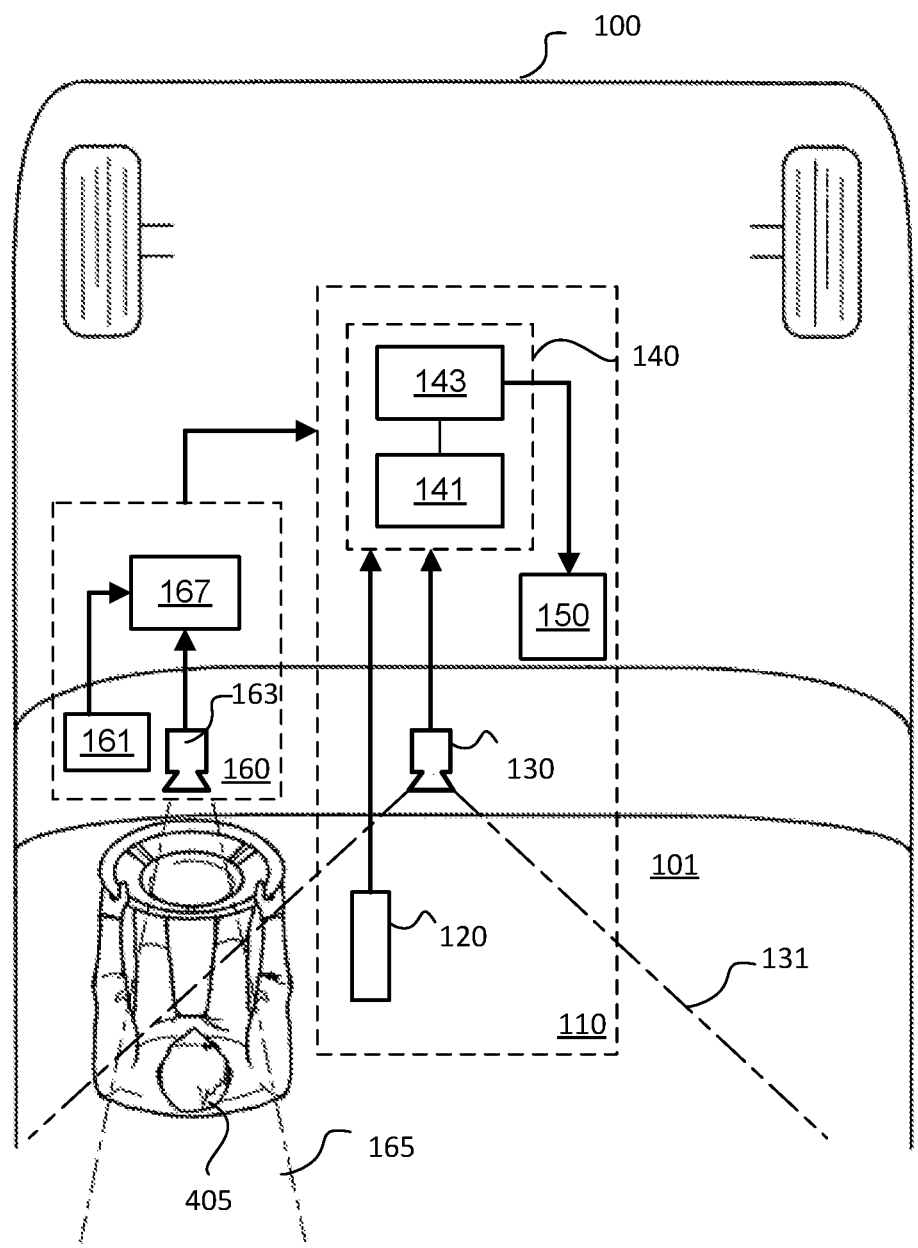
FIG. 1 is a schematic representation of an in-vehicle impairment detection system with driver verification in accordance with one example embodiment of the present disclosure.

Referring now to the drawings, wherein like reference numerals designate identical or corresponding parts throughout several views, the following description relates to a method and system for in-vehicle impairment detection with driver verification. This disclosed invention, including all embodiments shown and described herein, could be used alone or together and/or in combination with one or more of the features covered by one or more of the claims set forth herein, including but not limited to one or more of the features or steps mentioned in the Summary and the Claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

FIG. 1 is a schematic representation of an in-vehicle impairment detection system with driver verification in accordance with one example embodiment of the present disclosure. As seen, vehicle 100 includes a driver—405, an impairment detection and verification system 110, and additional vehicle sensor system 160. Vehicle 100 may be a typical passenger vehicle, a cargo vehicle (such as a semi-trailer truck or pickup truck), heavy machinery, or any other manually operated vehicle. The impairment detection and verification system 110 includes a biosensor 120, an image sensor 130, an analysis module 140, and a vehicle enablement system 150. Additional vehicle sensor system 160 is optionally provided to augment the impairment detection and verification system 110, such as by improving accuracy and/or reliability of the system 110. The biosensor 120 and image sensor 130 are located within the vehicle cabin 101, while other aspects of the system 110 may be located elsewhere in the vehicle 100.

Biosensor 120 is a touch-based device located in a predetermined location of the vehicle cabin 101, in the vicinity of driver D. The biosensor 120 senses at least one property at a region of human skin, which correlates to the presence of at least one substance having a physiological affect which can impair the human's ability to drive a motor vehicle. For example, biosensor 120 may be a transdermal sensor for detecting chemical properties of fluids on the region of skin, an optical sensor for detecting optical properties of the region of skin, or any other sensor for sensing a physical property of the region of skin that can be correlated to impaired driving by physiological, biochemical or pharmacological analysis.

The substance detected may be an illicit drug, recreational drug or a substance not ingested by the driver but indicative of impaired driving ability. For example, the biosensor 120 may detect properties that can be correlated to blood alcohol concentration (BAC), or certain hormones or substances that are produced by the body in circumstances that indicate impaired driving ability. In some embodiments, the biosensor 120 is capable of sensing a property that indicates the mere presence of a substance that impairs driving, while in other embodiments the sensor 120 is capable of detecting a variable property that correlates to the concentration of a substance for determining impairment.

Biosensor 120 is preferably located to permit contact with a predetermined region of the driver's skin which improves accuracy of the sensed property. As noted in the Background section above, touch based systems incorporated into the start button or steering wheel may lead to false negatives. The present inventors have recognized that this may be due to the number and/or density of blood vessels and capillaries in the body part touching the sensor during the test. For example, the inventors recognized that human fingers and thumbs typically used to press the start button of a vehicle have fewer blood vessels and capillaries than the fatty ball of flesh at the base of the thumb and palm (called the thenar). Depending on normal, moderate and severely restricted blood flow in hands, the thenar region may ultimately produce a slightly higher response under a wider range of conditions. Thus, the inventors determined that a more suitable location for the sensor 120 is a surface which the thenar or palm of the hand touches in the normal course of driving, such as the driver hand rest or palm rest.

Alternative locations of the biosensor 120, such as on the push-to start button or steering wheel, may be used in conjunction with the driver verification feature of the disclosed embodiments. For example, embodiments disclosed herein contemplate image verification of the driver pressing a start button which incorporates biosensor 120, though this may provide less accuracy of substance detection as noted above. Further, image-based verification of driver contact with biosensors 120 provided on the steering wheel may be used despite lack of packaging space due to the airbag and electronics in the top control module in passenger vehicles. In particular, the present disclosure contemplates biosensor 120 provided on the steering wheel of fleet vehicles in which packaging space is less scarce than with passenger vehicles.

Biosensor 120 generates an electrical signal representative of the property sensed, and outputs such signal to the analysis module 140 as discussed below. An analog-to-digital converter may be provided within the sensor 120 itself and used to convert the electrical signal into digital form. Alternatively, the analog-to-digital converter may be provided separately from the biosensor 120, such as within the analysis module 140, for example.

Image sensor 130 senses image data used for validating that the driver is the person who actually touched the biosensor 120 and for whom impairment has been determined. The image sensor 130 is preferably a 3D time of flight (TOF) camera that can differentiate the hand of the vehicle driver 405 versus the hand of passengers in vehicle 100. This is to avoid people from fooling the impairment detection system 110 by using the passenger's hand or other objects that may permit an impaired driver to fool the system.

As is known in the art, a 3D TOF camera operates by illuminating the scene of interest with a modulated light source, and observing light reflected from the scene. Phase shift between the illumination light and the reflection light is measured and translated to distance. Typically, the illumination light is provided by a solid-state laser or an LED operating in the near-infrared (NIR) spectrum which—may or may not be invisible to the human eyes. Wavelengths of 850 nm or 940 nm may be used, for example. An imaging sensor designed to respond to the same spectrum receives the light and converts the photonic energy to electrical charges. The light entering the sensor has both the ambient light component and the reflected component.

Field of view (FoV) of the TOF camera must be chosen appropriately as per the coverage requirements for the application. In the embodiment of FIG. 1, the image sensor 130 may be a TOF camera mounted in the center near the dome module to detect the scene of the vehicle cabin 101, including the driver 405 and other occupants. The FoV 131 should encompass the torso, arm and hand of the driver—405, the predetermined location of the biosensor 120, the torso, arm and hand of any non-driver in the passenger seat of the vehicle 101, as well as any object entering this scene A primary purpose of a 3D sensor is to acquire three dimensional data of the objects in the real world that are inside the sensor field of view. Therefore such a sensor provides some kind of point cloud data that holds information of the position of the objects they are representing, i.e. x, y and z values in real world coordinates. A variant of 3D sensors are called 2D+depth (or 2D+Z) sensors, which only have the depth or distance of a pixel available in real world coordinates, whereas the x and y coordinates are given in coordinates of the image plane. Although these are not true 3D sensors, software may be able to calculate the missing information based on other sensor parameters but at the cost of additional processing time. Thus, the image sensor 130 may be implemented as a 2D+depth image sensor.

Resolution and frame rate of the TOF camera is selected as appropriate to meet the available computing power and the requirements of the impairment detection and verification system 110. Pixel resolution, i.e. the number of pixel columns and the number of pixel rows, is a common measure of resolution for the TOF camera. The pixel resolution in combination with the viewing angles determines the angular resolution and the lateral resolution, which are also indicators for the sensor's accuracy. Another measure is the depth resolution which describes the discretization in a direction of the depth axis. The smallest difference in depth that can be measured is usually expressed in millimeters and decreases with increasing distance from the sensor. The depth resolution can also be expressed in percent, in that case it can be converted to millimeters by multiplying the percentage by the corresponding distance value. In one embodiment, the distance resolution of the image sensor 130 is about 1 cm, but the lateral resolution is generally low compared to standard 2D video cameras.

If the resolution of the TOF image sensor is too low, small structures like the fingers of a vehicle occupant might get separated from the palm, be merged together, or will not be visible at all, especially at fast movements. This will make it hard to recognize the hand on the biosensor, for example. On the other hand, if the resolution is very high, the frames may have to be down sampled to allow processing in real-time.

The frame rate (i.e., the frequency at which consecutive frames are provided) is selected to provide accurate recognition of the scene as desired. Compared to 3D laser scanning methods for capturing 3D images, TOF cameras operate very quickly, providing up to 160 images per second. A frame rate of 24 frames per second can be considered as a reference value which is used in digital cinema and is perceived smoothly by the human eye. A lower frame rate requires less processing capability, but implies low data quality such as motion blur. However, this may be adequate to simple verification purposes which differentiate the driver's arms from other arms in the vehicle cabin 101, particularly since movement within the cabin tends to be slow. On the other hand, a sensor frame rate that is very high may be needed to incorporate more advanced verification features such as identification by facial recognition, or determining impairment by recognition of facial gestures indicative of impairment.

Those skilled in the art will take into account the complexity of the system and the available computing resources when deciding on the optimal pixel resolution and frame rate. Further, there may be different work modes so the resolution and frame rate can be adapted to the intended use case.

The images acquired by the image sensor 130 are transmitted, in the form of a data stream to the analysis module 140.

The analysis module 140 includes a processor 141, such as a microprocessor, and a memory storage 143, such as a rewritable nonvolatile memory. The analysis module 140 receives signals generated by the biosensor 120 and image sensor 130, and processes these signals to determine impairment and to verify the driver D. Based on a result of this processing, the analysis module 140 provides a control signal to the vehicle enabling device 150 to enable operation (or prevent operation) of the vehicle 100. A method in conformity with embodiments of the disclosed herein, such as that described below, may be implemented in a device 110 including the biosensor 120, image sensor 130, analysis module 140, and vehicle enabling system 150.

The vehicle enabling system may be an interlock that prevents starting of the vehicle, that prevents operation of the gear shifter, or any other mechanism for enabling/disabling driving operation of the vehicle 100.

Additional sensor system 160 may be included to provide greater accuracy and/or reliability of the biosensor 120 and the image sensor 130. For example, the additional sensor system 160 may include various physical sensors 161 such as seat sensors or contact sensors throughout the cabin 101, and/or additional image sensors 163 to improve the accuracy, reliability or other characteristics of the system 110. For example, a hand rest or arm rest in the cabin 101 that incorporates the biosensor 120 may also include contact sensors to confirm that the driver's arm or hand is in contact with the rest before initiating the biosensor measurement. Further, sensors 161 may include additional biosensors at different locations in the cabin 101 to measure the same or additional properties of the occupant to improve confidence in the detection and verification determinations of the system 110.

As another example, an image sensor 163, such as a video camera, may be placed facing the driver's 405's face, as represented by field of view 165 in FIG. 1. The image sensor 163 is provided separately from the image sensor 130, and is designed and placed so that the driver's face is completely included in the field of view 165. It may be advantageous to use a "multimodal" image sensor 163, i.e. sensitive both to radiation in the visible range and, for example, to radiation in the infrared range. One of the steps of the method provided here includes facial recognition of the driver's face within the acquired images. The information provided by additional images taken in the infrared range facilitates this facial recognition since the driver's body (notably at the level of their face) has a higher temperature than its surroundings, and therefore stands out in an image taken in the infrared range. Further, images acquired in the infrared range permit facial recognition even at night or in contexts in which the light is too low for the images acquired in the visible range to be usable. In an alternative embodiment, rather than providing a separate image sensor 163, facial recognition is provided as an additional capability of the image sensor 130. For example, the image sensor 130 may be a driver monitoring system (DMS) including a near IR camera that uses pulsed LED information such as the 3D TOF camera discussed above, but with higher resolution to determine facial features.

Electrical signals generated by the additional sensors 161 and 163 may be provided to an analog to digital converter 167 before being input to the system 110.

Figure 2:
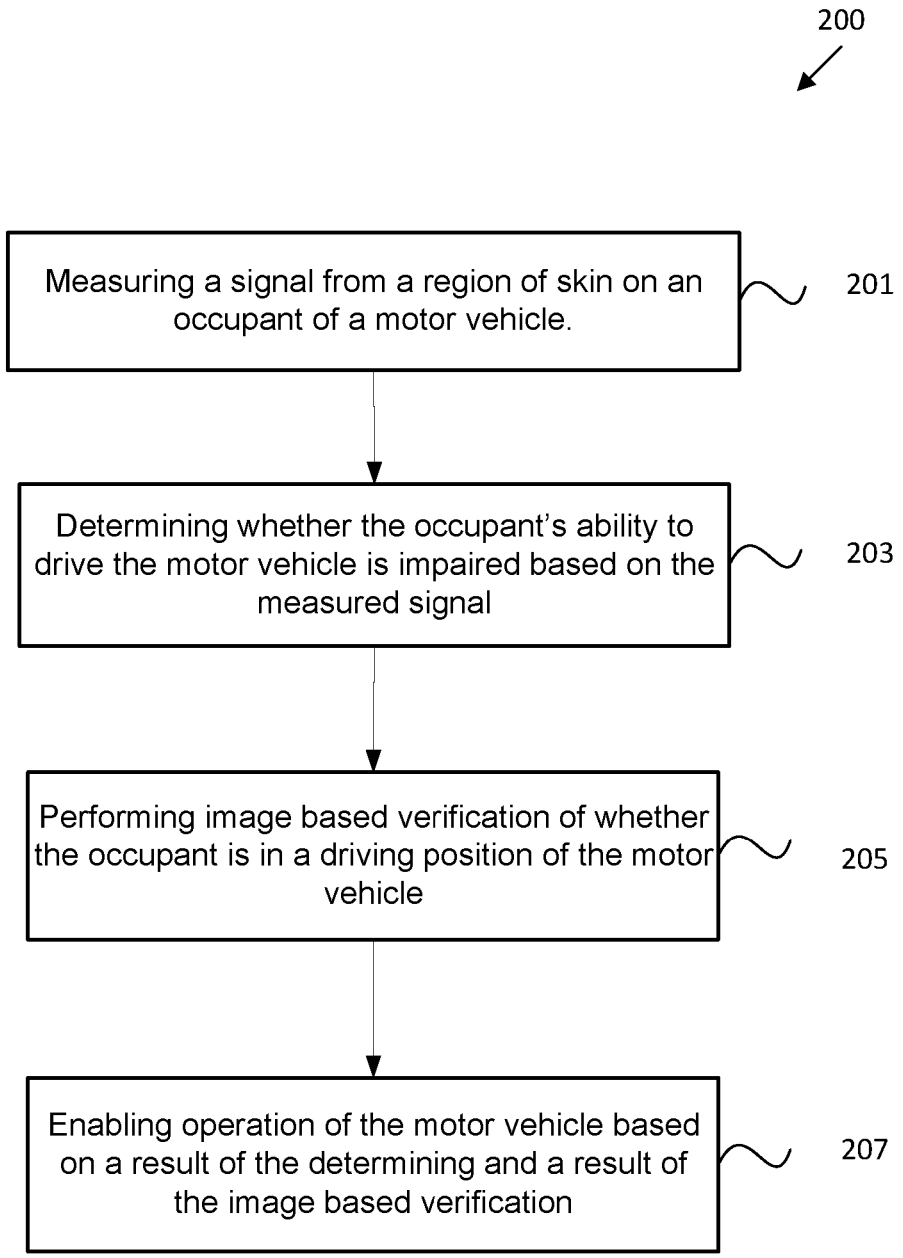
FIG. 2 is a process flow diagram indicating an impairment detection and driver verification process that may be performed by an in-vehicle detection and verification system according to embodiment of this disclosure.

FIG. 2 is a process flow diagram indicating an impairment detection and driver verification process that may be performed by an in-vehicle detection and verification system according to embodiments of this disclosure. As seen, the process 200 includes measuring a signal from a region of skin on an occupant of a motor vehicle at step 201. Such measurement may be performed by any type of biosensor capable of measuring a property of the region of human skin. For example, transdermal or optical sensors may be used, as noted above.

In step 203, a determination is made as to whether the vehicle occupant who was measured in step 201 is impaired in his or her ability to drive the vehicle. This determination of impairment may be based on the presence of a substance in a biological system of the occupant that can impair driving, or additionally based on measured concentrations of such substance.

As also seen in FIG. 2, in step 205, an image based verification is made to determine whether the occupant from which a determination was made in step 203 is in a driving position of the motor vehicle. This verification may be based on a TOF camera mounted in the cabin 101 of the vehicle 100 to collect image data that can distinguish the driver being tested by the biosensor 120 from other occupants of the vehicle tested by the biosensor 120. In step 207, operation of the motor vehicle 100 is enabled (or prevented) based on a result of both the determining in step 203 and a result of the image based verification in step 205.

Figure 3:
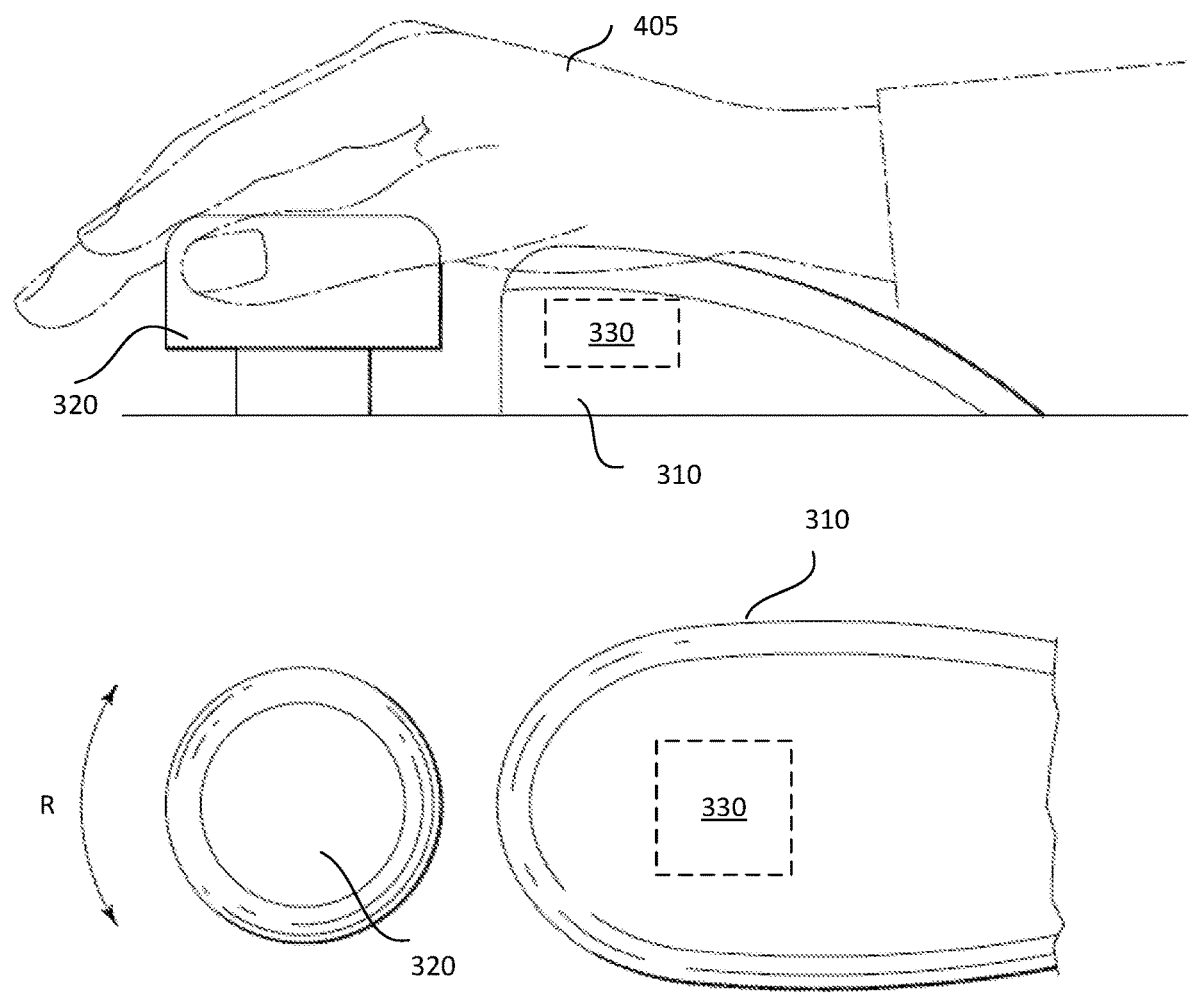
FIG. 3 shows a biosensor incorporated into a hand rest in accordance with an example embodiment of the present disclosure.

FIG. 3 shows a biosensor incorporated into a hand rest in accordance with an example embodiment of the present disclosure. The top portion of FIG. 3 shows a side view of the arrangement, while the bottom portion shows a planar view of the arrangement. As seen, hand rest 310 is provided to facilitate use of automatic transmission shift paddle 320. The hand rest 310 is provided adjacent to the paddle 320 such that the driver's hand is ergonomically situated to naturally rotate the paddle 320 in order to change gears of the vehicle transmission. As also seen, biosensor 330 is provided at a top surface of the hand rest 310 such that the palm of the drivers hand faces down with thenar portion of the palm in contact with the biosensor 330 during normal operation of the paddle 320.

Figure 4:
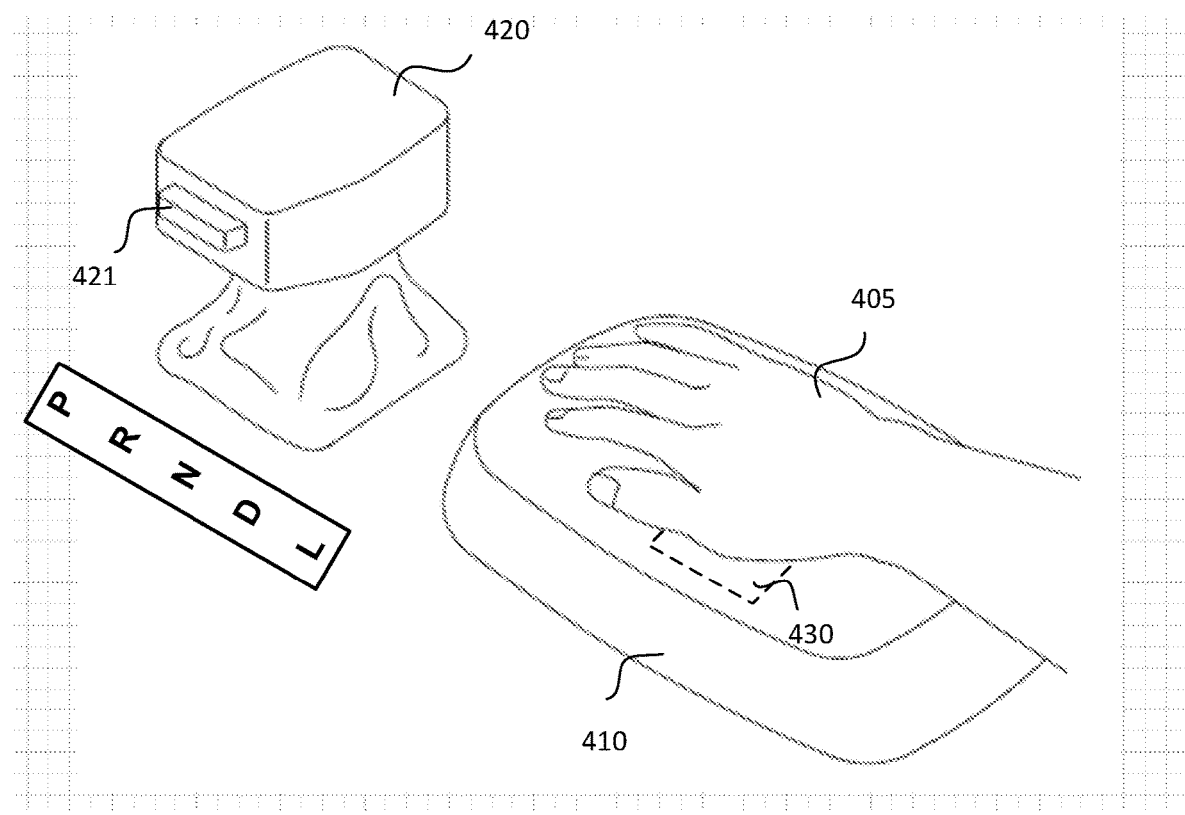
FIG. 4 shows a biosensor incorporated into an arm rest in accordance with another example embodiment of the present disclosure.
Figure 4:
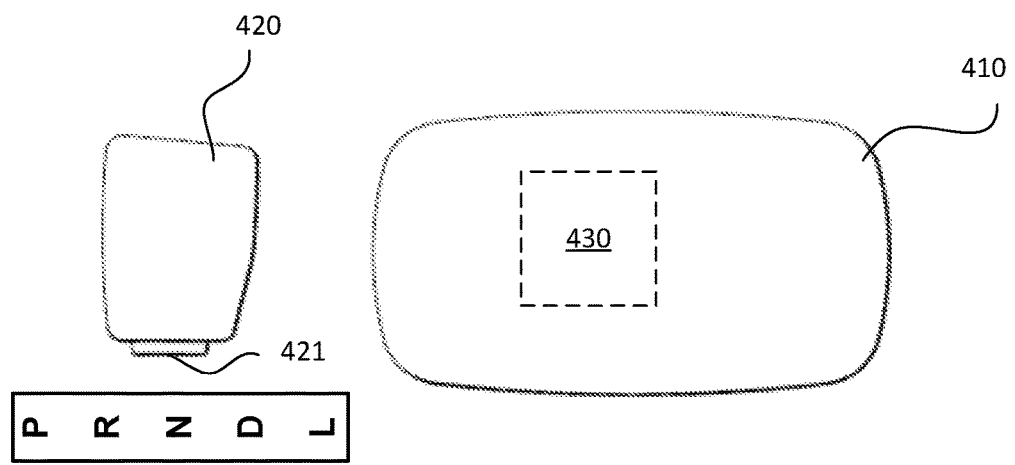

FIG. 4 shows a biosensor incorporated into an arm rest in accordance with another example embodiment of the present disclosure. The top portion of FIG. 4 shows a side view of the arrangement, while the bottom portion shows a planar view of the arrangement. As seen, arm rest 410 is provided adjacent to a traditional transmission shifter 420 having a shift operation button 421. The shift operation button 421 is depressed to enable movement of the shifter 420 to different transmission positions P, R, N, D and L as shown. Biosensor 430 is provided at a top surface of the arm rest 410 such that the palm of the driver's hand can be placed face down with a thenar portion of the palm in contact with the biosensor 430 to permit sensing operation of the biosensor 430. The arm rest 410 is generally not utilized during operation of the shifter 420, but rather provides an ergonomically situated resting place for the driver's arm during driving. Thus, in the embodiment of FIG. 4, the driver 405 typically places his or her hand on the arm rest 410 for the specific purpose of conducting the driver impairment test.

Figure 5:
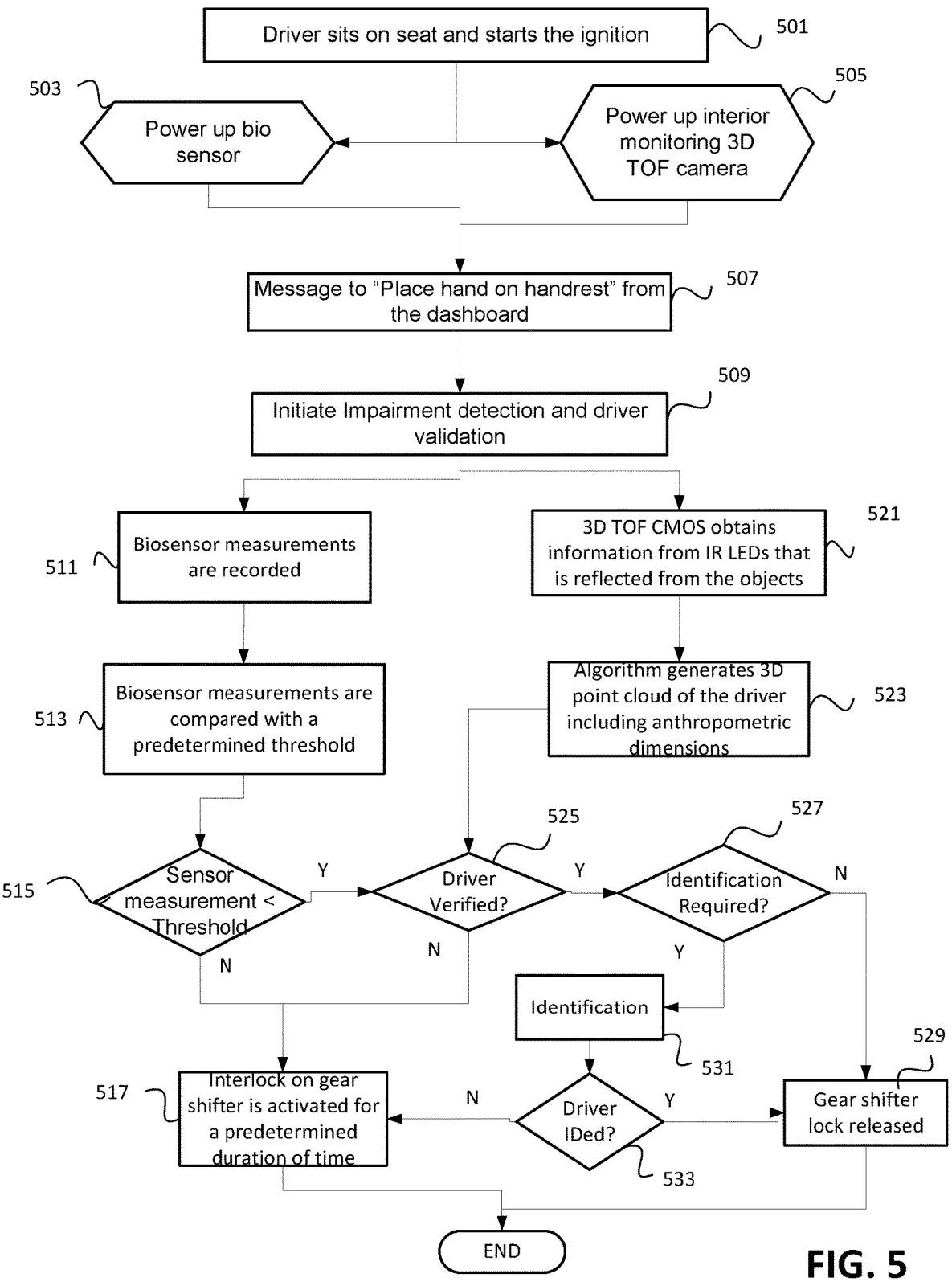
FIG. 5 is a process flow diagram describing a driver's use of the example embodiments of FIGS. 3 and 4 in which the biosensor is uniquely placed on a hand rest or arm rest to provide sensing as a seamless part of the driving task.

FIG. 5 is a process flow diagram describing a driver interfacing with the example embodiments of FIGS. 3 and 4 in which the biosensor is uniquely placed on a hand rest or arm rest to provide sensing for alcohol detection, for example, as a seamless part of the driving task. When the driver enters the vehicle, he or she sits in the driver seat and turns on the ignition as shown in step 501. Starting of the ignition causes the biosensor 120, 330, 430 and the interior driver monitoring 3D TOF camera 130 to power up as seen in steps 503 and 505. In one example, the biosensor may be an alcohol detection sensor which may operate with 12 VDC and draw 0.5 amps.

At this point, the vehicle motor is started and the driver's arms and hands are typically placed in a comfortable position. In the example of FIG. 3, the thenar part of the hand may be naturally placed on the hand rest 310 with fingers in the vicinity of the paddle 320, while in the example of FIG. 4 the driver's thenar may be on the armrest 410 for testing purposes only, and after the testing, the driver may move his/her hand and place it on the shifter 420 to depress the shifter button 421. In some embodiments, the hand rest 310 or arm rest 410 may include one or more capacitive contact sensors to determine whether the driver has made any contact with the hand rest 310 or arm rest 410, and whether the contact is in a proper region for sensing. In the embodiment of FIG. 4, the driver may be prompted by a dash board message or audible message to remove his or her elbow from the armrest and place their thenar in proper position for testing. This allows activation of the Reverse or Drive on the PRND rotary, or gear shifter only after the driver touches with the palm of hand on the "hand rest" which contains the biosensor and touches the rotary. For example, activation of the PRND in rotation is "blocked" (for example, with a motor or magnetorheological system), when a substance impairment threshold is reached and the contact detections on hand rest and rotary (using capacitive or resistive sensors) are positive. For example, if the blood alcohol concentration of the occupant is measured to exceed a predefined blood alcohol threshold, then the PRND rotation is blocked.

With the driver's hand provided in the proper position, detection of impairment and verification of the driver is initiated as seen in step 509. This may involve actuators to ready the biosensor 120, 330, 430 and activate infrared IR LEDs (which are not visible to the occupants) to illuminate the scene within the cabin 101 of the vehicle 100. As noted, in one example, the biosensor 120, 330, 430 may measure blood alcohol levels under the skin's surface by shining an infrared-light through the thenar using infrared spectroscopy, or measure transdermal alcohol concentration (TAC) through chemi-capacitive sensing. In step 511, the biosensor measurement is recorded. Where the biosensor 120 is a transdermal sensor, TAC is extracted from the thenar region of the palm by the biosensor in step 511. The driver 405 may be required to wait a predetermined period time, such as 10 seconds, for completion of the transdermal test. An electrical signal generated by the biosensor 120 as a result of the test is then sent to the analysis module 140 which determines if a blood alcohol concentration (BAC), or other biosensor measurement, is less than an impairment threshold value stored in the memory 141 as indicative driver impairment as shown by decision block 515.

Continuing with the BAC example, in one embodiment, where the BAC measured is not less than the impairment threshold (i.e., alcohol concentration is over the legal limit to impair driving ability), an interlock on the paddle 320 or gear shifter 420 is activated for a predetermined duration of time, such as 1 minute as shown in step 517. Thus, in the embodiment of FIG. 5, activation of the interlock prevents operation of the paddle 320 or gear shifter 420. It is to be understood, however, that in some embodiments, maintaining the interlock in its normal operating state (i.e., without "activating") may be used to disable the vehicle. Where the BAC (or other sensor measurement) is determined to be less than the legal threshold, the vehicle is not immediately enabled, but rather the process continues to decision block 525 where driver verification is determined based on the images obtained by the 3D TOF camera.

In the embodiment of FIG. 5, a 3D TOF camera detects image data from near IR light reflected off of objects in the scene as shown in step 521. The TOF detector may be a charge-coupled device (CCD) or CMOS detector. This information is used to generate a 3D point cloud map of the scene including anthropometric dimensions of the driver and other occupants within the field of view of the TOF camera as seen in step 523. This 3D information is processed by the analysis module 140 to validate whether the hand which performed the biosensor (e.g., transdermal alcohol concentration) test is connected to the arm and body of the occupant sitting in the driver's seat as shown by decision block 525.

Where the system determines that the hand tested by the transdermal sensor was not that of the actual driver in the driver's seat, the interlock on the gear shifter or paddle is activated to disable operation of the vehicle for a predetermined time in step 517. Where the system verifies that the hand tested by the transdermal sensor was that of the actual driver in the driver's seat and no further identification of the driver is required, the interlock on the gear shifter is released in step 529 and the process ends. It should be noted that using an interlock on the gear shifter is only an example method for enabling/disabling operation of a vehicle. In general, operation of the vehicle may be enabled and/or disabled using any other method without departing from the teachings of the present disclosure.

Thus, according to embodiments disclosed herein, image-based driver verification is a necessary requirement to enable operation of the vehicle. The use of a 3D TOF camera permits such verification to be accomplished with relatively low processing power and without the need for preloaded driver identity information stored in memory. That is, verification with a TOF camera provides sufficient resolution and frame rate to accurately distinguish any driver in the driver seat from any other occupant of the vehicle such that advanced knowledge of driver identity is not required. This general driver verification feature may facilitate broader implementation of impairment detection and verification system as a standard component in more vehicles.

In some embodiments, simple verification of the driver is not sufficient and further identification is required to confirm that driver D, having passed the impairment test, has a specific identification. This may be useful where a vehicle is authorized for use only by a particular individual, such as with employee drivers of fleet vehicles. Decision block 527 determines whether further identification of the driver is required. If such identification is required, then the identification is performed in step 531. Identification may be accomplished by storage of the necessary identification information in the memory 141, and comparison with real time measurements of the driver in the driver's seat. If the identity is not matched, then the interlock on the gear shifter is activated for a predetermined time in step 517, otherwise the shifter is released in step 529 to permit operation of the vehicle.

One example of driver identification may be implemented by the image sensor 163 of the additional sensor system 160. In this example, an IR LED source or eye safe laser illuminators turn on, and a modulated light source (IR) pulsed or modulated continuous wave (typically square wave) shines on target (e.g., head, torso, arms). Light reflects back to the camera lens. Pixel array develops charge that represents correlation between incident and reflect light from the target scene. Information is processed to create high resolution image of driver's face, and an algorithm calculates face points. If the Driver's Face Points equal the Saved ID, then the interlock is de-activated.

Figure 6:
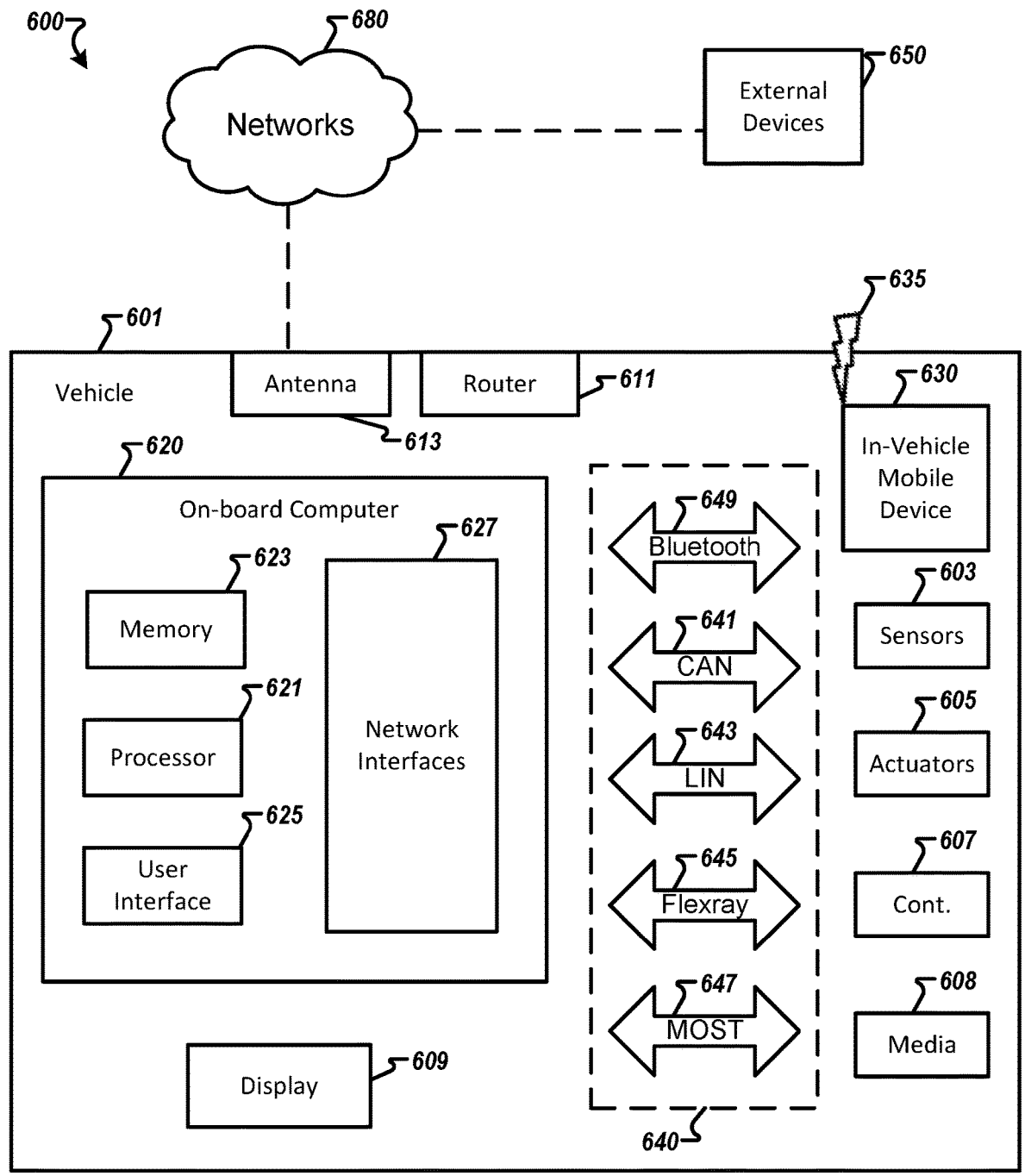
FIG. 6 is a simplified block diagram of a vehicle environment in which embodiments disclosed herein may be implemented.

FIG. 6 is a simplified block diagram of a vehicle environment in which embodiments disclosed herein may be implemented. The vehicle environment 600 includes a vehicle 601 in communication with one or more external devices 650 by way of one or more external networks 680. Vehicle 601 also includes various internal networks 640 for interconnecting several vehicle devices within the vehicle as will be discussed below. The vehicle environment 600 may also include one or more in-vehicle mobile device 630. External devices 650 include any device located outside the vehicle 601 such that the external device must communicate with the vehicle and its devices by an external network 680. For example, the external devices may include mobile devices, electronic devices in networked systems (e.g., servers or clients in a local area network (LAN), etc.), on board computers of other vehicles etc. In-vehicle mobile devices 630 are devices which are located within, or in the vicinity of the vehicle 601 such that the in-vehicle mobile device can communicate directly with internal networks 640 of the vehicle 601. In-vehicle mobile devices 630 may also connect with external networks 680 as discussed below.

Vehicle 601 includes vehicle devices integral with or otherwise associated with the vehicle 601. In the embodiment of FIG. 6, vehicle devices include one or more sensors 603, one or more actuators 605, one or more control units 607, one or more media systems 608, one or more displays 609, one or more routers 611, one or more antenna 613, and one or more on board computers 620. As used herein, the term "vehicle device" is meant to encompass sensors, actuators, controllers, electronic control units (ECUs), detectors, instruments, embedded devices, media devices including speakers, a CD and/or DVD player, a radio, etc, vehicle navigation systems (e.g., GPS) displays, other peripheral or auxiliary devices or components associated with the vehicle 601.

Sensors 603 detect various conditions within (or in the immediate vicinity of) the vehicle 601. For example, sensors 603 may be temperature sensors, photosensors, position sensors, speed sensors, angle sensors or any other sensor for detecting a diagnostic condition or other parameter of the vehicle 601 or its ambient environment. Sensors 603 may be passive or "dumb" sensors that provide an analog representative of the sensed parameter, or so called "smart" sensors with integrated memory and digital processing capability to analyze the parameter sensed within the sensor itself. Actuators 605 cause motion of some mechanical element of the vehicle in response to a control signal. For example, actuators 605 may be hydraulic actuators, pneumatic actuators or electrical/electronic actuators such as a stepper motor. Actuators 605 may be used to move enable or disable operation of the gear shifter based on a result of driver impairment detection and verification processes in accordance with embodiments disclosed herein.

Actuators 605 may also be "dumb" devices that react to a simple analog voltage input, or "smart" devices with built-in memory and processing capability. Actuators 605 may be activated based on a sensed parameter from sensors 603, and one such sensed parameter may be a physical position of the actuator 603 itself. Thus, the sensors 603 and actuators 605 may be connected in a feedback control loop for diagnostic detection and control of the vehicle 601.

Control units 607 include any embedded system, processor, electronic control unit (ECU) or microcontroller. Control unit 607 may be dedicated to a specific region or function of the vehicle 601. For example, control unit 607 can provide memory and control logic functions for several dumb devices, such as passive sensors 603 and actuators 605. In one embodiment, control unit 607 is an ECU dedicated for controlling an interlock device according to embodiments disclosed herein. Typically, numerous ECUs, with different embedded software, may be found in a single automobile and may communicate via internal networks as discussed below.

On-board computer 620 is a vehicle device for providing general purpose computing functionality within the vehicle 601. The on-board computer 620 typically handles computationally intensive functions based on software applications or "apps" loaded into memory. On-board computer 620 may also provide a common interface for different communication networks in the vehicle environment 600. On-board computer 620 includes one or more processor 621, one or more memory 623, one or more user interface 625, and one or more network interface 627. One or more display 609 and one or more router 611 may be an integral part of the on board computer 610, or distributed in the vehicle and associated with the on-board computer and other vehicle devices. Separate displays 609 may be provided in suitable locations for access by a driver and passengers in the vehicle 601.

On-board computer 620, and other associated or integrated components such as vehicle devices can include one or more memory element 66 for storing information to be used in achieving operations associated with enabling vehicle operation based on driver impairment detection and verification as disclosed herein. Further, these devices may keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in vehicle environment 600 could be provided in any database, register, table, cache, queue, control list, or storage structure, based on particular needs and implementations, all of which could be referenced in any suitable timeframe.

In example embodiments, the operations for enabling vehicle operation based on driver impairment detection and verification may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar vehicle device, etc.). In some of these instances, one or more memory elements (e.g., memory 623) can store data used for the operations described herein. This includes the memory elements being able to store software, logic, code, or processor instructions that are executed to carry out the activities described in this Specification.

Processor 621 can execute software or algorithms to perform activities to enable vehicle operation based on driver impairment detection and verification as disclosed herein disclosed herein. A processor 621 can execute any type of instructions associated with the data to achieve the operations detailed herein. In one example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of computer-readable mediums suitable for storing electronic instructions. Any of the potential processing elements, modules, microprocessors, digital signal processors (DSPs), and other devices described herein should be construed as being encompassed within the broad term 'processor.'

Elements of FIG. 6 may be communicatively coupled to one another by one or more suitable communications medium (wired, wireless, optical) that provides a pathway for electronic communications. Any element in FIG. 6 may act as a network node in communication with any other element of FIG. 6 also acting as a network node. Any suitable network messaging protocol, network topology or network geographic scope may be included in the vehicle environment 600. Thus, embodiments of on-board computer 610 may include one or more distinct interfaces, represented by network interfaces 627, to facilitate communication via the various networks (including both internal and external networks) described herein. Such network interfaces 627 may be inclusive of multiple wireless interfaces (e.g., WiFi, WiMax, 3G, 4G, white space, 802.11x, satellite, Bluetooth, LTE, GSM/HSPA, CDMA/EVDO, DSRC, CAN, GPS, etc.). Other interfaces represented by network interfaces 26, may include physical ports (e.g., Ethernet, USB, HDMI, etc.), interfaces for wired and wireless internal subsystems, and the like. Similarly, each of the nodes of vehicle environment 600 can also include suitable interfaces for receiving, transmitting, and/or otherwise communicating data or information in the vehicle environment 600.

Multiple internal vehicle networks represented by 640 may exist in the vehicle 601 to provide communication pathways to various vehicle devices distributed throughout the vehicle 601. An internal vehicle network 640 is a collection of nodes, such as vehicle devices, integrated with or otherwise linked to the vehicle and interconnected by communication means. Vehicle networks 640 typically include hard wired bus type networks, each providing communication pathways to particular vehicle devices distributed throughout a vehicle. FIG. 6 shows four examples of such hard wired networks: Controller Area Network (CAN) 641, Local Internet Network (LIN) 643, Flexray bus 645, and Media Oriented System Transport (MOST) network 647.

CAN bus 641 uses a message based protocol, designed for and typically used by automotive applications. The CAN bus 641 is a vehicle bus standard designed to allow microcontrollers, sensors, and other devices to communicate with each other via the CAN without a host computer. CAN protocol may be used for soft real-time control of devices such as a vehicle antilock braking system. For example, CAN bus 641 may connect a transmission sensor and an energy sensor to a main engine controller, and a different CAN bus may connect the main engine controller and a main body controller to on-board computer 620. LIN network 643, may be used to sense external conditions such as light, or to control small mechanisms such as door locking systems. For example, LIN bus 643 may connect a driver's seat actuator, temperature controls, and windshield wiper actuators to a main body controller of a CAN bus.

Flexray bus 645 is typically a dedicated network for hard real-time controllers, used for drive-by-wire and/or brake-by-wire applications in which information from the engine and/or wheels of the vehicle 601 is collected and transmitted to appropriate applications and/or data repositories. For example, Flexray bus 645 may connect a chassis module of the vehicle 601 to on-board computer 620 through an appropriate interface, and/or may connect brakes and electronic stability control (ESB) to the chassis module attached to Flexray 645. MOST network 647 can also be found in vehicles for transmitting audio, video, and voice on fiber optics. MOST buses 647 can connect media system 608, to on-board computer 620 through appropriate interfaces, and/or connect a reversing camera and a navigation system to an intermediate device which is connected to computer by MOST bus 647.

Other hard wired internal networks such as Ethernet may be used to interconnect vehicle devices in the vehicle. Further, internal wireless networks 649, such as near field communications, Bluetooth etc. may interconnect vehicle devices.

External networks 68 may be accessed from vehicle 601 by vehicle devices and in-vehicle mobile devices 630 when a communication link is available. In-vehicle mobile devices 630 include mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within vehicle environment 600. Data, may be any type of numeric, voice, video, or script data, or any type of source or object code, or any other suitable information in any appropriate format that may be communicated from one point to another in electronic devices and/or networks. A vehicle router 611 may also be used to access external network infrastructure within range of the antenna 613 of vehicle 601.

Some form of wireless communication is needed to achieve external network connectivity from vehicle 601. For example third generation (3G), fourth generation (4G), and 3GPP long term evolution (LTE) wireless telephone technologies, worldwide interoperability for microwave access (WiMax), WiFi, and dedicated short-range communications (DSRC) are some of the numerous wireless technologies currently available with the appropriate interfaces and network infrastructure to support the technology. The information on the biosensor 120, image sensor 130 and additional image sensor 163 tests, can be transmitted to a remote location for verification by a third party about the results of the tests for impairment. This implies continuous monitoring which may be useful for commercial fleet vehicle drivers.

Users (driver or passenger) may initiate communication in vehicle environment 600 via some network, and such communication may be initiated through any suitable device such as, in-vehicle mobile device 630, display 609, user interface 625, or external devices 650.

In-vehicle mobile devices 630, and mobile devices external to vehicle 601, may communicate with on-board computer 620 through any wireless or wired communication link and may be configured as a personal area network (PAN) or a wireless personal area network (WPAN) or any other appropriate networking architecture or system that facilitates communications in a network environment. Wired and wireless communication links may any electronic link such as Bluetooth, wireless technologies (e.g., IEEE 802.11x), a USB cable, an HDMI cable, etc. In one example, an external mobile device may be connected to computer 62 through a USB cable or wireless network when, for example, the external mobile device is a diagnostic tool used by a mechanic for servicing vehicle 100.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

The invention claimed is:

1. A method for enabling driver operation of a motor vehicle, comprising:
   receiving, by processing circuitry and via a biosensor, an electrical signal of a region of skin of an occupant in the motor vehicle, the region of skin of the occupant being in contact with the biosensor and the electrical signal indicating whether the occupant's ability to drive the motor vehicle is impaired;
   determining, by the processing circuitry, whether the occupant's ability to drive the motor vehicle is impaired based on the received electrical signal;
   performing, by the processing circuitry and when it is determined that the occupant's ability to drive the motor vehicle is not impaired, an image based verification to determine whether the occupant is in a driving position of the motor vehicle; and
   generating, by the processing circuitry and based on the performed image based verification, a control signal controlling operation of the motor vehicle.

2. The method of claim 1, wherein the biosensor is a transdermal alcohol detecting sensor.

3. The method of claim 1, wherein the biosensor is an optical sensor, the method further comprising
   detecting, by the processing circuitry, optical properties of the region of skin of the occupant based on the electrical signal received from the optical sensor.

4. The method of claim 1, wherein the determining whether the occupant's ability to drive the motor vehicle is impaired comprises
   analyzing, by the processing circuitry, the received electrical signal to estimate a concentration of at least one substance in the occupant,
   comparing, by the processing circuitry, the estimated concentration to a threshold concentration, and
   determining, by the processing circuitry, whether the occupant's ability to drive the motor vehicle is impaired based on the comparison.

5. The method of claim 4, wherein the analyzing the received electrical signal comprises
   determining, by the processing circuitry, a blood alcohol concentration (BAC) of the occupant.

6. The method of claim 1, wherein the performing the image based verification comprises
   acquiring, by the processing circuitry and via a camera, image data of a scene in a cabin of the motor vehicle, and
   analyzing, by the processing circuitry, the acquired image data to determine whether the region of skin of the occupant is contiguous with a body of an occupant in the motor vehicle that is in the driving position of the motor vehicle.

7. The method of claim 6, wherein the camera is a near infrared (IR) camera.

8. The method of claim 1, wherein the generating the control signal comprises
   generating, as the control signal, a vehicle enabling signal when the image based verification determines that the occupant is in the driving position of the motor vehicle.

9. An apparatus comprising:
   a biosensor disposed at a predetermined location in a cabin of a motor vehicle and configured to
     detect an impairing substance during contact between the biosensor and an occupant in the motor vehicle seated within the cabin of the motor vehicle;
   an interlock device configured to control a drive train of the motor vehicle;
   an image capturing device configured to acquire an image of the cabin of the motor vehicle; and
   a processor configured to
     compare a value of the detected impairing substance to a threshold,
     determine, based on the acquired image of the motor vehicle and when the value of the detected impairing substance satisfies the threshold, whether the occupant in contact with the biosensor is seated in a driving position of the motor vehicle, and
     control, based on the determination of whether the human occupant in contact with the biosensor is seated in the driving position of the motor vehicle, the interlock device to enable or disable engagement of the drive train.

10. The apparatus of claim 9, wherein the impairing substance is alcohol.

11. The apparatus of claim 9, wherein the biosensor is a transdermal alcohol detection sensor configured to detect alcohol during contact between the biosensor and a palm of the occupant.

12. The apparatus of claim 11, wherein the transdermal alcohol detection sensor is disposed on at least one of an armrest of the motor vehicle, a hand rest of the motor vehicle, and a wrist rest of the motor vehicle.

13. The apparatus of claim 9, wherein the processor is further configured to determine whether the occupant in contact with the biosensor is seated in the driving position of the motor vehicle by
   determining, based on the acquired image of the motor vehicle, whether a body part of the occupant in contact with the biosensor is a body part contiguous with an occupant seated in the driving position of the motor vehicle.

14. The apparatus of claim 13, wherein the processor is further configured to
    disable engagement of the drive train, by activating the interlock device, when the body part of the occupant in contact with the biosensor is not contiguous with the occupant seated in the driving position of the motor vehicle.

15. The apparatus of claim 9, wherein the image capturing device is a three-dimensional time of flight camera that generates point cloud data of occupants in the cabin of the motor vehicle.

16. The apparatus of claim 9, wherein the interlock device is mechanically-coupled to a gearshift to enable or disable engagement of the drive train.

17. The apparatus of claim 16, wherein the biosensor is disposed proximal to the gearshift such that the gearshift can be operated by the occupant while the occupant is in contact with the biosensor.

18. The apparatus of claim 11, wherein the biosensor is a transdermal sensor.

19. A device for enabling vehicle operation, comprising:
    a controller including a processor and a memory which stores a software routine executable by the processor to:
        determine, based on an electrical signal received from a biosensor in contact with a region of skin of an occupant in a motor vehicle, whether the occupant's ability to drive the motor vehicle is impaired;
        perform, when it is determined the occupant's ability to drive the motor vehicle is not impaired, an image based verification to determine whether the occupant is in a driving position of the motor vehicle; and
        generate, based on the image based verification, a control signal controlling operation of the motor vehicle.

* * * * *